(12) United States Patent
Uyama

(10) Patent No.: US 7,219,229 B2
(45) Date of Patent: May 15, 2007

(54) PROTECTED COMMUNICATION SYSTEM

(76) Inventor: Yasumasa Uyama, Room 504, 30-15, Kurihama 8-chome, Yokosuka-shi, Kanagawa, 239-0831 (JP)

( * ) Notice: Subject to any disclaimer, the term of this patent is extended or adjusted under 35 U.S.C. 154(b) by 707 days.

(21) Appl. No.: 10/021,052

(22) Filed: Dec. 19, 2001

(65) Prior Publication Data

US 2002/0126848 A1  Sep. 12, 2002

(30) Foreign Application Priority Data

| Dec. 21, 2000 | (JP) | ............................. 2000-388921 |
| Oct. 24, 2001 | (JP) | ............................. 2001-326908 |
| Dec. 5, 2001 | (JP) | ............................. 2001-370959 |

(51) Int. Cl.
*H04L 9/00* (2006.01)

(52) U.S. Cl. ..................................... 713/162

(58) Field of Classification Search ................ 713/201, 713/162; 709/20, 206; 455/410
See application file for complete search history.

(56) References Cited

U.S. PATENT DOCUMENTS

| 5,574,785 A | * | 11/1996 | Ueno et al. ..................... 380/2 |
| 5,583,940 A | * | 12/1996 | Vidrascu et al. ............ 713/151 |
| 5,930,479 A | | 7/1999 | Hall |
| 5,933,501 A | * | 8/1999 | Leppek ........................ 380/259 |
| 6,307,837 B1 | * | 10/2001 | Ichikawa et al. ............ 370/230 |
| 6,424,828 B1 | * | 7/2002 | Collins et al. ........... 455/412.1 |
| 6,738,828 B1 | * | 5/2004 | Keats et al. ................. 709/245 |
| 6,907,123 B1 | * | 6/2005 | Schier .......................... 380/28 |

FOREIGN PATENT DOCUMENTS

| EP | 0 702 477 | 3/1996 |
| JP | 59-061242 | 4/1984 |
| JP | 01-212041 | 8/1989 |
| JP | 04-142164 | 5/1992 |
| JP | 08-204698 | 8/1996 |
| JP | 11-143794 | 5/1999 |
| JP | 2000-020424 | 1/2000 |
| JP | 2000-162965 | 6/2000 |

OTHER PUBLICATIONS

Menezes et al. (Alfred J. Menezes, Paul C. van Oorschot, Scott A. Vanstone, "Handbook of applied cryptography", 1997, ISBN: 0849385237) p. 234.*
Gennaro et al., "Two-Phase Cryptographic Key Recovery System," Computers & Security, Elsevier Science Ltd., vol. 16, 1997, pp. 481-506.

* cited by examiner

*Primary Examiner*—Kambiz Zand
*Assistant Examiner*—Peter Poltorak
(74) *Attorney, Agent, or Firm*—Foley & Lardner LLP

(57) ABSTRACT

A protected communication system, wherein an information device utilizing memory device and operation device is connected via the network. Enciphering and deciphering of transmitting or receiving data is automatically processed according to unique enciphering method and deciphering method determined by the ordered pair of sender and receiver at each information device.

6 Claims, 19 Drawing Sheets

Fig.8

(a) Mr. Akiyama's address book

| name | address | enciphering key | enciphering software | deciphering key | deciphering software |
|---|---|---|---|---|---|
| X Company | Xcp@kabu···· | KCax | Cax | 25 | P |
| (Mr.) Ito | Ito@asn···· | KCai | Cai | 1 | P |
| (Mr.) Saito | Saito@uu···· | KCas | Cas | -2 | P |
| (Mr.) Baba | Baba@yy···· | KCab | Cab | 22 | P |

(b) Mr. Ito's address book

| name | address | enciphering key | enciphering software | deciphering key | deciphering software |
|---|---|---|---|---|---|
| X Company | Xcp@kabu···· | KCix | Cix | KPxi | Pxi |
| (Mr.) Akiyama | Akiyama@ss···· | (-1) | C | KPai | Pai |
| (Mr.) Saito | Saito@uu···· | KCis | Cis | KPsi | Psi |
| (Mr.) Baba | Baba@yy···· | KCib | Cib | KPbi | Pbi |

(c) Mr. Saito's address book

| name | address | enciphering key | enciphering software | deciphering key | deciphering software |
|---|---|---|---|---|---|
| X Company | Xcp@kabu···· | KCsx | Csx | KPxs | Pxs |
| (Mr.) Ito | Ito@asn···· | KCsi | Csii | KPis | Pis |
| (Mr.) Akiyama | Akiyama@ss···· | 2 | C | KPas | Pas |
| (Mr.) Baba | Baba@yy···· | KCsb | Csb | KPbs | Pbs |

*Fig.10*

(a) Mr. Akiyama's address book

| name | address | enciphering key | enciphering software | deciphering key | deciphering software |
|---|---|---|---|---|---|
| X Company | Xcp@kabu····· | KCax | Cax | d, n | PS |
| (Mr.) Ito | Ito@asn····· | KCai | Cai | d, n | PS |
| (Mr.) Saito | Saito@uu····· | KCas | Cas | d, n | PS |
| (Mr.) Baba | Baba@yy····· | KCab | Cab | d, n | PS |

(b) Mr. Ito's address book

| name | address | enciphering key | enciphering software | deciphering key | deciphering software |
|---|---|---|---|---|---|
| X Company | Xcp@kabu····· | KCix | Cix | KPxi | Pxi |
| (Mr.) Akiyama | Akiyama@ss····· | e, n | C | KPai | Pai |
| (Mr.) Saito | Saito@uu····· | KCis | Cis | KPsi | Psi |
| (Mr.) Baba | Baba@yy····· | KCib | Cib | KPbi | Pbi |

(c) Mr. Saito's address book

| name | address | enciphering key | enciphering software | deciphering key | deciphering software |
|---|---|---|---|---|---|
| X Company | Xcp@kabu····· | KCsx | Csx | KPxs | Pxs |
| (Mr.) Ito | Ito@asn····· | KCsl | Csl | KPis | Pis |
| (Mr.) Akiyama | Akiyama@ss····· | e, n | C | KPas | Pas |
| (Mr.) Baba | Baba@yy····· | KCsb | Csb | KPbs | Pbs |

*Fig.12*

(a) Mr. Ito's address book

| name | address | enciphering key | enciphering software | deciphering key | deciphering software |
|---|---|---|---|---|---|
| X Company | Xcp@kabu····· | | | | |
| (Mr.) Akiyama | Akiyama@ss····· | KCia | Cia | | |
| (Mr.) Saito | Saito@uu····· | | | | |
| (Mr.) Baba | Baba@yy····· | | | | |

(b) Mr. Akiyama's address book

| name | address | enciphering key | enciphering software | deciphering key | deciphering software |
|---|---|---|---|---|---|
| X Company | Xcp@kabu····· | | | | |
| (Mr.) Ito | Ito@asn····· | | | KPia | Pia |
| (Mr.) Saito | Saito@uu····· | | | | |
| (Mr.) Baba | Baba@yy····· | | | | |

Fig.13

| name | address | enciphering 1 | | enciphering 2 | | ..... | deciphering 1 | | deciphering 2 | | ..... |
|---|---|---|---|---|---|---|---|---|---|---|---|
| | | software | key | software | key | | software | key | software | key | |
| (Mr.) Uyama | | | | | | | | | | | |
| (Mr.) Yamada | | | | | | | | | | | |

Fig.15

| name | address | enciphering 1 | | enciphering 2 | | ... | enciphering | | deciphering | |
|---|---|---|---|---|---|---|---|---|---|---|
| | | software | key | software | key | ... | text | attach-ment | text | attach-ment |
| (Mr.) Uyama | | | | | | | 1 2 3 4 5 | 4 2 | 1 3 | 5 |
| (Mr.) Yamada | | | | | | | 2 5 1 3 | 5 1 3 | | |

*Fig.16*

| name | address | enciphering 1 | | enciphering 2 | | ... | enciphering | | replacement per month (contents of the schedule file) | |
|---|---|---|---|---|---|---|---|---|---|---|
| | | software | key | software | key | | text | attach-ment | text | attach-ment |
| (Mr.) Uyama | | | | | | ... | 1 2 3 4 5 | 4 2 | 1 2 3 4 5<br>3 1 5 2 4 | 4 2<br>2 4 |
| (Mr.) Yamada | | | | | | ... | 2 5 1 3 | 5 1 3 | 2 5 1 3<br>5 3 2 1 | 5 1 3<br>3 5 1 |

*Fig.17*

(a) the memory contents of Mr. S's telephone
the telephone No. of Mr. S is 0901111···

| destination (number) | enciphering key 1 | enciphering key 2 | deciphering key 1 | deciphering key 2 |
|---|---|---|---|---|
| 0902222··· | a o i so ra ··· | Oaufefhgoo··· | Abdefg··· | na ni ka na ··· |
| 0903333··· | a BR a EW··· | C na mi 1 a ra ··· | Jj i so k ra | a b a t y o··· |
| | | | | |

(b) the memory contents of Mr. R's telephone
the telephone No. of Mr. R is 0902222···

| destination (number) | enciphering key 1 | enciphering key 2 | deciphering key 1 | deciphering key 2 |
|---|---|---|---|---|
| 0901111··· | Abcdefg··· | na ni ka na ··· | a o i so ra ··· | Oaufefhgoo··· |
| 0903333··· | Aaagg gW··· | A587XO··· | 4h3yg8jg85··· | Xooo ma R··· |
| | | | | |

*Fig.18*

| voice | Ko n ni chi wa ( Hello in Japanese)、 · · · |
|---|---|
| key 1 | a o i so ra a o i so ra a o i so ra a o i so ra |
| key 2 | ha te na ha te na ha te na ha te na ha te na |

( a )

| key 1 | a i u e o ka ki (written in Japanese character)· · · | 1,024 bytes |
|---|---|---|
| key 2 | a d f e o h r o r h o h f o · · · · | 997 bytes |
| key 3 | 1 6 4 6 7 4 2 8 7 4 4 4 4 5 6 · · · | 991 bytes |

( b )

PROTECTED COMMUNICATION SYSTEM

TECHNICAL FIELD

The present invention relates to a protected communication system using a network, and particularly to a protected communication system, capable of easily realizing a high degree of safety in communication and preventing communication interception and the like, by automatically enciphering the transmitting files or the like according to a certain enciphering method set for each transmission destination.

BACKGROUND OF THE INVENTION

Following the recent IT revolution, the internet communication such as electronic mail (referred simply as e-mail hereinafter) or the like for example, are becoming essential to the modern society. On the other hand, such internet communication is being questioned of its safety and reliability due to increasing number of communication interception victims. FIG. 16 shows an exemplary way of intercepting communication, and in the drawing, an interception device called sniffer is set without authorization within the network (near the entrance of the router in this example), and shows a case of illegally intercepting valuable information such as passwords or the like.

In order to prevent such communication interception, an application of enciphered communication may be given as a countermeasure proposal. However, the current enciphered communication requires cumbersome preparation and high cost, and therefore has not spread amongst the general public. Even in cases using the enciphered communication system, such method tends to be fixed and thus does not guarantee safety from communication interception due to ease of deciphering.

BRIEF SUMMARY OF THE INVENTION

The present invention is made in view of such problems, and an object of the present invention is to provide a system of protected communication enabling a highly safe communication over the network.

Another object of the present invention is to provide a computer software enabling highly safe protected communication over the network.

A yet another object of the present invention is to provide a telephone machine using public telephone network to realize a communication high in concealment.

A yet another object of the present invention is to attempt to realize a safe and reliable network society through the spread of such protected communication system.

Other and further objects and effects of the present invention will be appreciated by a person having ordinary skill in the art with reference to the specification stated in the following.

The protected communication computer software of the present invention is applied to the information processing device such as a personal computer or the like, having a memory and communication means through the network. Within the memory of the information processing device, a plurality of kinds of enciphering programs and deciphering programs, and a reference table in which a relationship between a transmission destination data and enciphering program, and a relationship between a transmission source data and deciphering program is stored.

The protected communication computer software of the present invention is equipped with means for automatically enciphering a transmission anticipated file according to an enciphering program, upon input of a designated enciphering instruction. The enciphering program is automatically specified by looking up the reference table using the transmission destination data as a key, and read out from the memory of the information processing device.

The protected communication computer software of the present invention is further equipped with means for automatically deciphering a received enciphered file according to a deciphering program upon input of a designated deciphering instruction. The deciphering program is automatically specified by looking up the reference table using a transmission source data of received enciphered file as a key, and read out from the memory of information processing device.

The term "file" used here comprises various data being carried over the network such as, text file, image files, program file, and the like.

IP address, e-mail address and the like, can be given as examples of "transmission destination data".

The terms "enciphering program" and "deciphering program" are realized by enciphering key, enciphering software, deciphering key and deciphering software. Also in such a case, here, for example, if the 'software' is the same and the 'key' is different, it will be considered a 'different program'. Also, each program realized according to such an enciphering software and deciphering software, the enciphering and deciphering software may be interlocked into the protected communication software beforehand, but separately enable input and/or renewal, then renewing and exchanging the program is facilitated.

According to the protected communication computer software of the present invention, the designated file can be enciphered and/or deciphered according to different method (program) for each transmitting source or transmitting destination. Therefore, compared to the prior methods wherein the enciphering method tends to be fixed, even higher degree of safety in realizing protected communication can be provided.

Also, according to the protected communication computer software of the present invention, plurality of "enciphering program" or "deciphering program" may be set beforehand to correspond to each person. In this case, a program to be used will be specified out of a plurality of programs each time. Such method of specifying may be based on various methods, for example, 'the time of enciphering', 'the total number of times transmitted to that individual', or the like, or based on an identification code designated by the transmitter each time, can be given, but at least, the enciphering program used at the time of enciphering, and the deciphering program used on the receiving side of the enciphered file, must be able to correspond to each other on 1 to 1 bases.

According to the protected communication computer software of the present invention, preferably, comprising an e-mail software transposition means for utilizing an address book of an e-mail software already saved in the information processing device as a reference table.

According to the protected communication computer software of the present invention, preferably, comprising e-mail transmitting means for transmitting the enciphered transmission anticipated file attached to an e-mail to the designated transmission destination.

According to such structure, enciphered file can be sent or received by e-mail, and therefore the ease of use is improved.

Also, "Transmission anticipated file attached to an e-mail" is mentioned above. Even in cases where the object of enciphering is the main text of an e-mail, it is still included in the term "attached (attachment)" used herein.

According to the protected communication computer software of the present invention, preferably, under the reference table, plurality of enciphering programs together with application order data, may be set to correspond to a single transmission destination data, and transmission anticipated file specified by transmission destination data with correspondence attached, are enciphered in multiple stages using plurality of enciphering programs in a sequence according to application order data. Also under the reference table, plurality of deciphering programs together with application order data, may be set to correspond to a single transmission source data, and deciphering file specified by transmission source data with correspondence attached, are deciphered in multiple stages using plurality of deciphering programs in a sequence according to application order data.

According to such structure, the degree of safety regarding communication interception or the like is increased. Also, preferably, a plurality of enciphering programs or deciphering programs are set to correspond separately to each main text of an e-mail and attachment file of an e-mail, for each transmission destination data or each transmission source data, under the reference table.

According to such structure, mainly, by performing suitable settings such as decreasing the degree of multiplicity for the attachment files tending to have large amount of data, the processing time of enciphering and/or deciphering can be shortened.

In this case, a suitable automatic change of the application order data according to a pre-set rule would further be preferred.

"a suitable automatic change . . . according to a pre-set rule" is mentioned above, for example, various methods such as, a change based on the 'date', 'frequency of use', or based on an identification code designated by the transmitter each time, and the like, can be given, but at least, the application order of the enciphering program used at the time of enciphering, and the application order of the deciphering program used on the receiving side of the enciphered file, must be able to correspond to each other on 1 to 1 bases.

In the above described protected communication computer software of the present invention, for example, it would be even more convenient if following means were added on:
(a) means that enables the user to designate which data (file) to transmit, and among the file, which data to encipher.
(b) means that enables the user to suitably designate whether to encipher or not for each file and the enciphering method to use, when transmitting multiple files.

Following, the telephone machine of the present invention is adapted to have, means for notifying the transmitter such as caller ID and the like, means of installing enciphering program and deciphering program, means of saving the transmission destination data corresponding to optional enciphering program as an enciphering reference data in the memory beforehand, memory means of saving the transmission source data corresponding to optional deciphering program as a deciphering reference data in the memory, means of transmitting the suitably enciphered transmitting voice signal using concerned enciphering program by specifying the enciphering program to be used in the communication, based on the transmission destination data regarding the communication of that time and the enciphering reference data, and means of producing voice of suitably deciphered voice signal received in order using concerned deciphering program by specifying the deciphering program to be used in the communication, based on the transmission source data regarding communication at that time, and the deciphering reference data.

According to the telephone machine of the present invention, preferably, plurality of enciphering program may be set to correspond to a single transmission destination under the reference table, and transmitting voice signal to the corresponding transmission destination with concerned correspondence attached, are enciphered in multiple stages based on plurality of enciphering programs, and also plurality of deciphering programs may be set to correspond to a single transmission source under the reference table, and transmitted voice signal from the transmission source data with concerned correspondence attached, are deciphered in multiple stages based on a plurality of kinds of deciphering programs.

BRIEF DESCRIPTION OF THE DRAWINGS

FIG. 8 is a table showing an exemplary content of an address book using secret key system.

FIG. 10 is a table showing an exemplary content of an address book using open key system.

FIG. 12 is a table showing the registration mode of enciphering method and deciphering method.

FIG. 13 is a table showing an exemplary form of an address book regarding multiple enciphering.

FIG. 15 is a table showing the content of an address book with added column for multiple adjustments.

FIG. 16 is a table showing an exemplary form of an address book regarding automatic process order renewal of multiple enciphering.

FIG. 17 is a table showing the memory content of a telephone machine regarding telephone machine enciphered communication.

FIG. 18 is a table showing a relationship of character arrangements regarding telephone machine enciphered communication.

DESCRIPTION OF THE SYMBOLS

Figure 1:
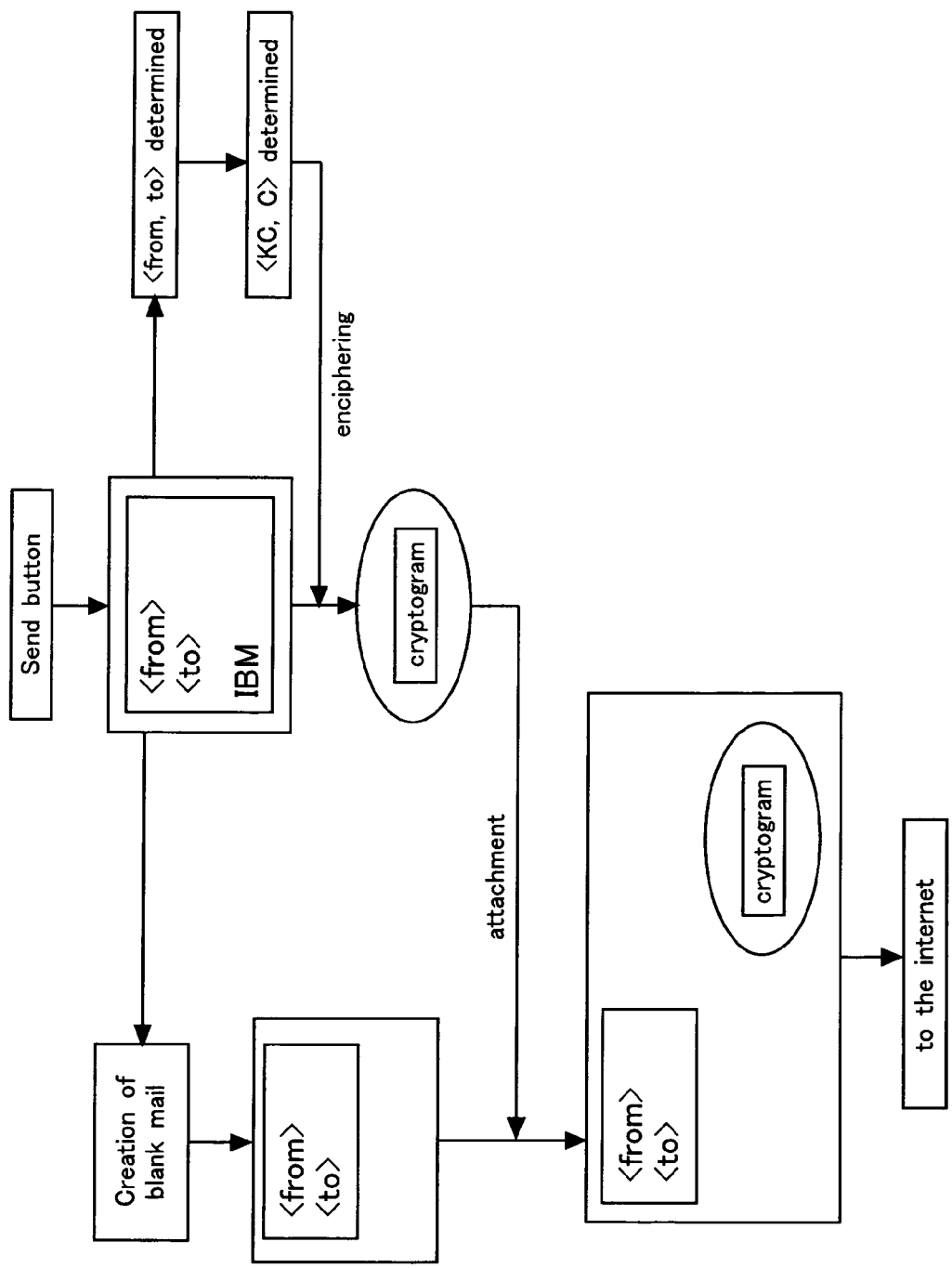
FIG. 1 is a table showing an exemplary content of an address book applied to the present invention.

1. A computer terminal machine of the source of transmission.
2. A computer terminal machine of the destination of transmission.

DETAILED DESCRIPTION OF THE PREFERRED EMBODIMENTS

In the following, the present invention relating to a protected communication system is described in detail with reference to the appended drawings.

First, an outline of the 'ordered pair system enciphered communication' employed as the protected communication method in this embodiment is described in the following. In this example, the ordered pair system enciphered communication is applied to a protected communication software as the protected communication system, and to telephone machines designed exclusively.

Under order pair system enciphered communication, the enciphering method and deciphering method are determined uniquely corresponding to the order pair of sender and receiver. So the function of the communication software (e-mail software, or the like) is expanded in order to perform the enciphered communication according to this method. The enciphering and the deciphering is performed automatically based on a prescribed enciphering key and an enciphering software, or a prescribed deciphering key and a deciphering software, utilizing an address book having a designated column for encipher method. Also, the encipher method can easily be updated to a new enciphering method, adjusting to the development of the deciphering technology. The receiver of the information determines the enciphering method as a general rule.

Among the enciphering part (enciphering key and enciphering software) and deciphering part (deciphering key and deciphering software), the enciphering part is authorized with freedom of redistribution. Also, the prohibition of redistribution is enabled for the deciphering part. By so doing, the enciphering software is financially guaranteed of development and merchandising on commercial bases, thus allowing a steady supply of high quality enciphering software.

Such method can also be applied to the telephone communication. However, memory device and operation device is required to be added on to the current telephone machines. Also the standard needs to be unified for certain items.

First, details regarding e-mails using the internet that can be readily realized using currently available hardware (personal computers and the like) is focused in the following description.

There are two ways (X, Y) and (Y, X) to line two objects, X and Y in order, and no other way is available. This law of nature is utilized in this invention.

[An Ordered Pair Based on Address]

Among the internet society, identification symbols that specify each individual, such as e-mail addresses and IP addresses exists. By specifying two people as the sender and the receiver of information, an ordered pair can be determined from the two e-mail addresses (sender, receiver).

An enciphering method is determined corresponding to this ordered pair. When (X, Y) is set as a transmission from Mr. X to Mr. Y, the receiver, Mr. Y has the freedom to determine the enciphering method in this case as a general rule.

Further, the information transmitted from Mr. X to Mr. Y, is automatically enciphered with predetermined enciphering method chosen by Mr. Y.

The enciphering technique relied upon by Mr. Y does not necessarily be the technique that is relied upon by Mr. X. Therefore, when Mr. X receives information from Mr. Y, the enciphering method determined by the ordered pair (Y, X) is used. In other word, the transmitted information is enciphered by enciphering method pre-set by Mr. X regarding Mr. Y

[Expanding the Address Book]

Within the currently available software in order to communicate over the internet, is an address book that lists names, e-mail addresses, organizations, and telephone numbers.

This address book is expanded and added with four items (columns), enciphering key, enciphering software, deciphering key, and deciphering software. The address book is modified as shown in the example in FIG. 1(a).

The symbols used in the same figure (a), KCax, Cax, Kpxa, and Pxa are set as the following:

| | |
|---|---|
| KCax: | An enciphering key for enciphering communications from Mr. Akiyama to X Company. |
| Cax: | An enciphering software for enciphering communications from Mr. Akiyama to X Company. |
| KPxa: | A deciphering key for deciphering enciphered communications from X company to Mr. Akiyama. |
| Pxa: | A deciphering software for deciphering enciphered communications from X company to Mr. Akiyama. |

Suppose that Mr. X transmits information to Mr. Y At this time, the ordered pair (X, Y) is determined and an enciphering method is uniquely determined corresponding to this ordered pair.

[The Function of the Protected Communication Computer Software at the Time of Transmission]

Once the information to be transmitted is given (specified), the destination address of the e-mail is looked up, and the enciphering key among the list of addresses, and the columns for enciphering software are checked. If the enciphering key and the enciphering software are predetermined, then the information to be transmitted is enciphered by running the predetermined enciphering software using the enciphering key used as the index.

A blank e-mail is created, listing only the address of the sender and the address of the destination, and the enciphered information is transmitted as an attachment file to this blank e-mail.

Figure 2:
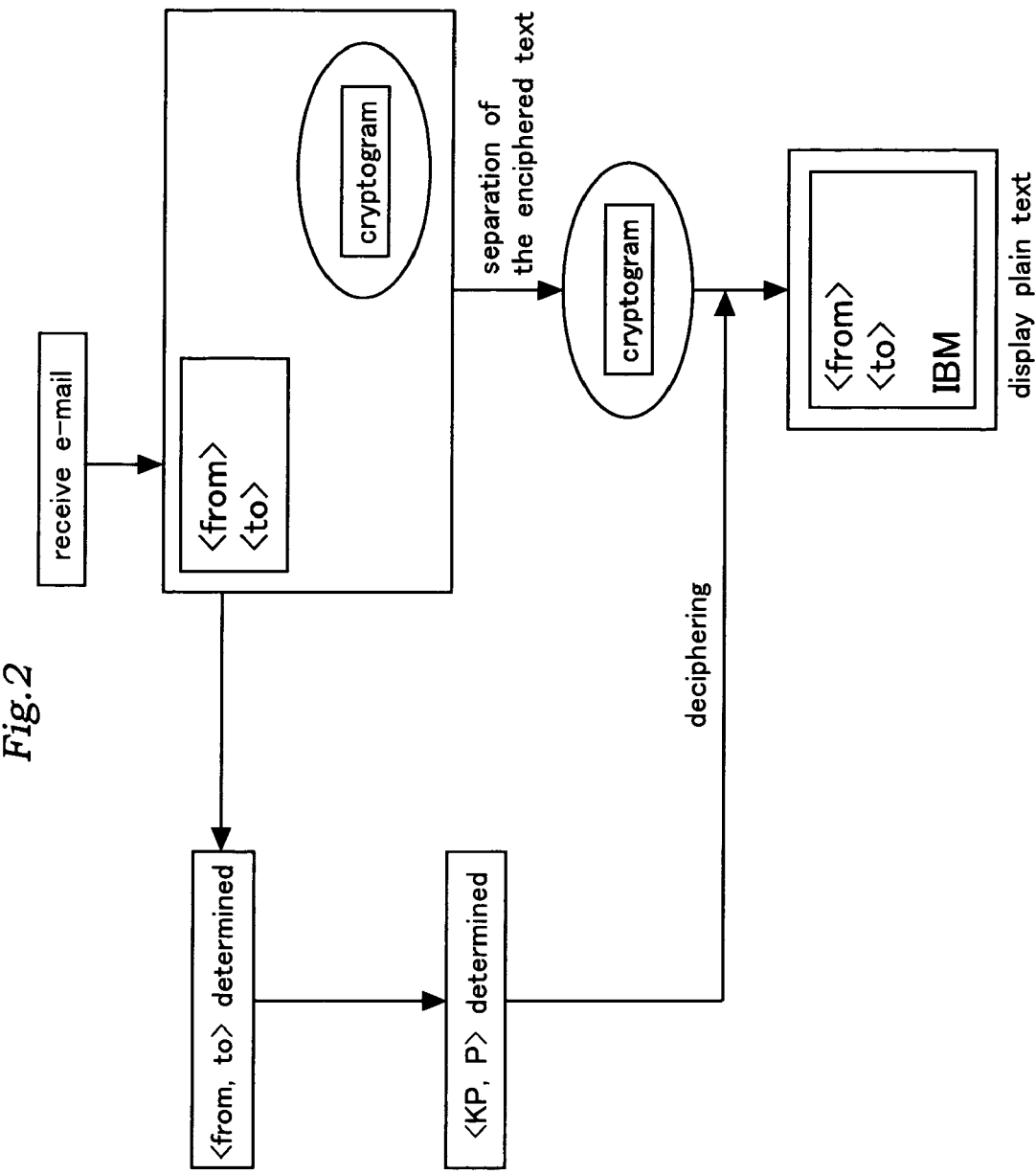
FIG. 2 is a diagram showing the outline of an exemplary content of enciphering process regarding the present invention.

Obviously, in cases when the e-mail address of the intended person is not in the address book, or the enciphering items are not determined even though the intended person is on the address book, the e-mail will be transmitted as it is, without enciphering. In this case, if an enciphered information were to be transmitted, the intended person will not be able to decipher it. Also, the function of the protected communication computer software, at the time of transmission is shown in FIG. 2.

[The Function of the Protected Communication Computer Software at the Time of Reception]

Figure 3:
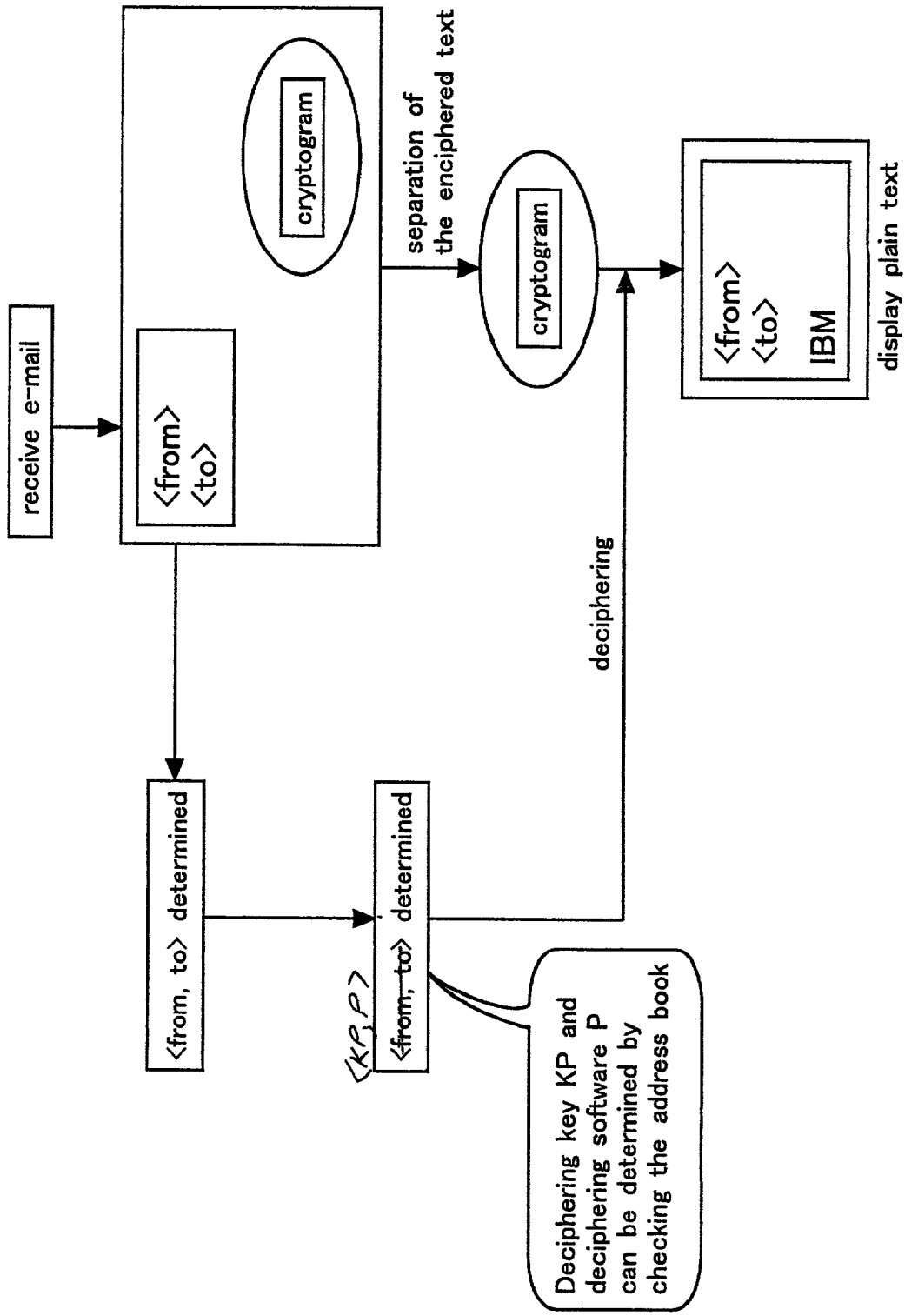
FIG. 3 is a diagram showing the outline of an exemplary content of deciphering process regarding the present invention.

Upon receipt of an enciphered e-mail, the sender is specified according to the e-mail address of the sender and the address book. If the sender is given a deciphering key and a deciphering software in the columns of the address book, the attached file is deciphered by running the deciphering software using the deciphering key as the index. Then the deciphered information is displayed. Obviously, if the e-mail is from a person not on the address book, or the deciphering items are not determined even though the sender is on the address book, then the e-mail is opened as it is, without deciphering. Also, the function of the protected communication computer software, at the time of receipt is shown in FIG. 3.

A protected communication computer software (it can also be a hardware) having above mentioned functions is produced. For further detailed example, the contents of the operation of the computer (CPU) relating to the e-mail communication realized by applying a software having such structure to a personal computer is shown in the flowcharts in FIGS. 4, 5, and 6.

Figure 4:
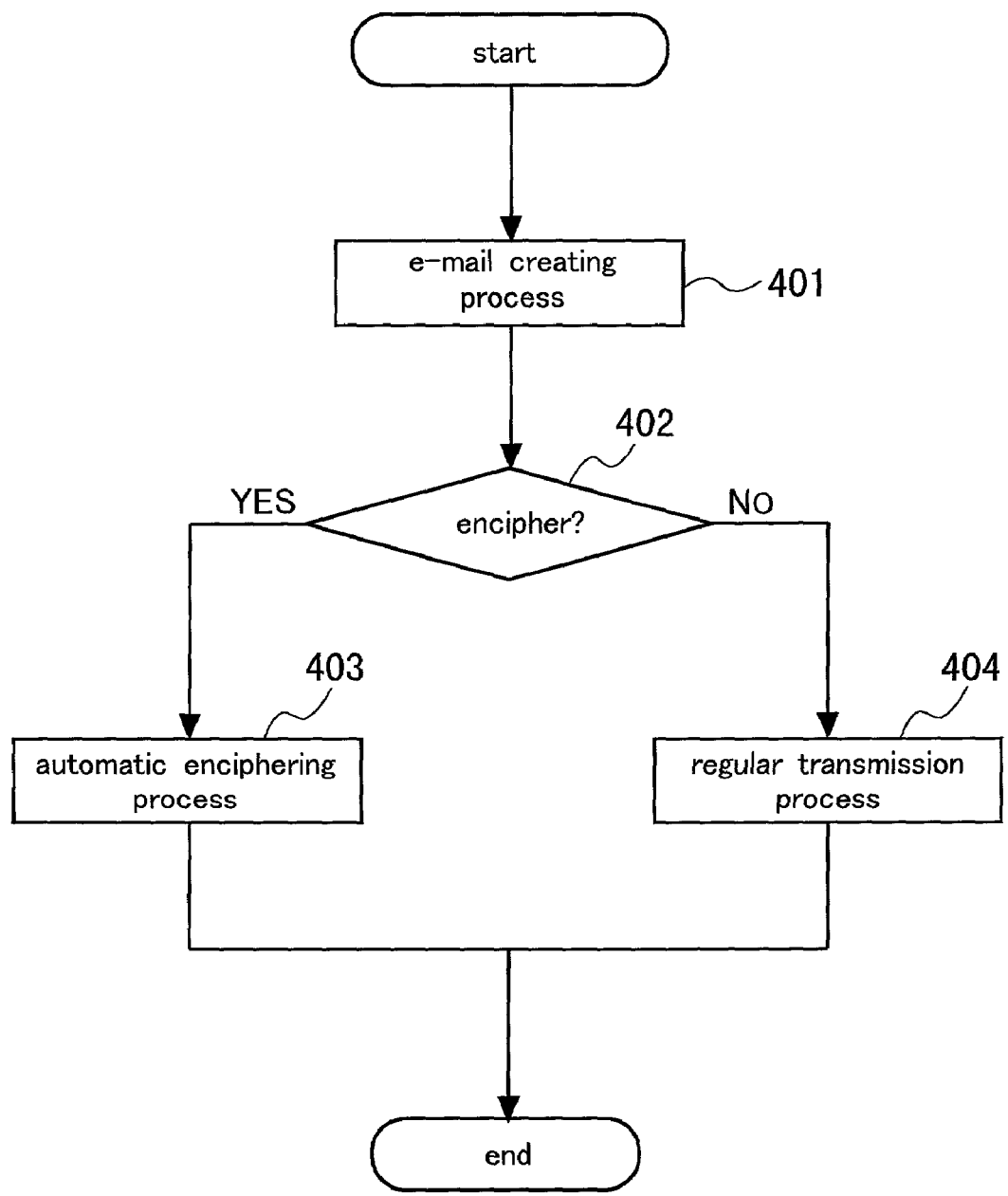
FIG. 4 is a flowchart showing the general operation content of the CPU at the time of an e-mail transmission.

FIG. 4 is a flowchart showing the contents of the operation of the CPU at the time of an e-mail transmission. In this example, after a regular e-mail (consisting of destination address, the text, the attachment files and the like) is created using commercially available e-mail software (Step 401), a prescribed enciphering instruction is given (Step 402, YES), and the contents of the created e-mail is enciphered and then transmitted (Step 403). Also, if the enciphering instruction is not given, and the instruction for regular transmission is given (Step 402, NO), then regular e-mail transmission procedure is performed (Step 404).

Figure 5:
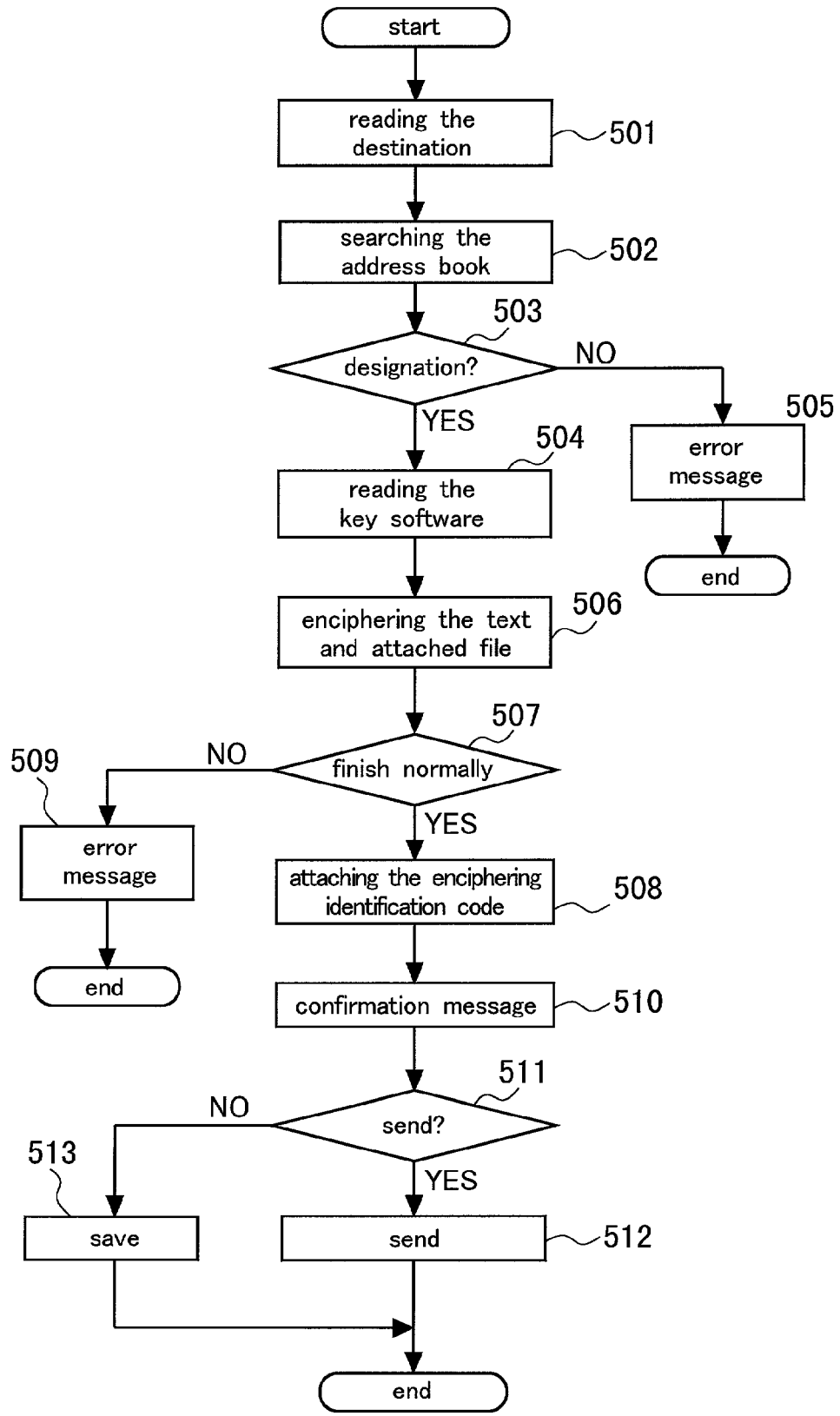
FIG. 5 is a flowchart showing the detailed content of automatic enciphering process.

FIG. 5 is a flowchart showing a detail of automatic enciphering process according to Step 403. In the automatic enciphering process, first, the destination address of the created e-mail in Step 401 is read (Step 501). Following, the enciphering method (enciphering key and enciphering software) is determined corresponding to the destination address based on the read address searched by using the address book having pre-expanded functions as described in FIG. 1 (Step 502). If the corresponding enciphering method is not determined (Step 503, NO), then an error message such as 'enciphering method is not specified' will be displayed via the monitor or the like (Step 505).

Once the enciphering method is prescribed (Step 503, YES) in Step 503, the prescribed enciphering key and the enciphering software is read, then, the text and the attached files are individually enciphered (Step 506).

The enciphering key and the enciphering software as well as the deciphering key and the deciphering software, which will be described in the following are stored in the memory of the hard disk of the computer beforehand.

Here, if for some reason (for example, mix in of data not possible to be enciphered, or the like) the enciphering process according to Step 506 is not performed properly (Step 507, NO), then an error message such as ' . . . (data) can not be enciphered' will be displayed via the monitor or the like (Step 509).

On the other hand, once the enciphering process is properly finished (Step 507, YES), then a data (enciphering identification code) for automatically determining that the e-mail includes enciphered data at the receiver's side is attached at the top of the enciphered text data Step 508.

Following, a message confirming the enciphered text to be transmitted or not, 'The enciphering is complete. Do you wish to send?' (along with 'Send' and 'Do not send'), will be displayed via the monitor and the like (Step 510).

Here, if 'Do not send' is selected by the users by using the cursor (Step 511, NO), the enciphered e-mail will not be transmitted right away, and be saved in a specified memory for the time being (Step 513).

On the other hand, if 'Send' is selected (Step 511, YES), then the enciphered e-mail will be transmitted according to the regular e-mail transmission procedure (protocol) (Step 512). Also in this example of e-mail transmission process, the transmission feature of the e-mail software is used.

Figure 6:
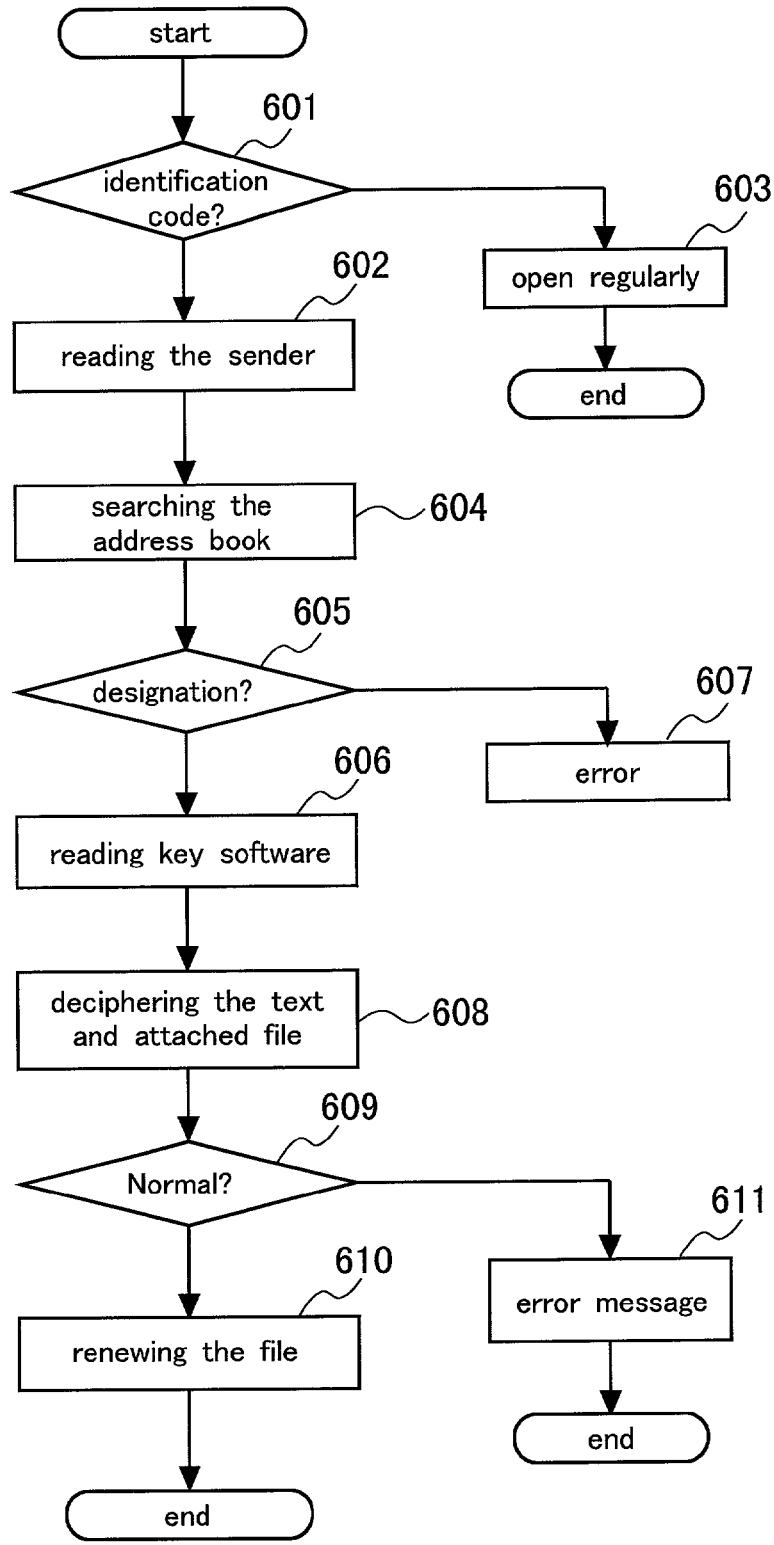
FIG. 6 is a flowchart showing the detailed operation content of the CPU regarding the deciphering process after the reception of an e-mail.

FIG. 6 is a flowchart showing the details of the operation contents of the CPU relating to an e-mail opening process.

In the embodiment of the present invention, upon opening the received file, first, whether the e-mail is enciphered or not is automatically distinguished. In other words, in this example, the enciphering identification code described in FIG. 5 Step 508, attached to the e-mail requested to be opened, is confirmed.

Here, if it is distinguished that there is no enciphering identification code (Step 601, NO), then regular opening process is performed (Step 603).

On the other hand, if the enciphering identification code is confirmed in Step 601 (Step 601, YES), then the deciphering process is initiated.

Upon deciphering process, first, the address of the e-mail sender (the source of transmission) is read (Step 602). Then, the address book is searched as already described in FIG. 1 based on the read address (Step 604), the deciphering method (the deciphering key and the deciphering software) corresponding to the sender is specified. If the deciphering method has not been determined (Step 605, NO), an error message such as, 'the deciphering method has not been set' will be displayed via a monitor or the like (Step 607).

Once the deciphering method is specified (Step 605, YES), the specified deciphering key and the deciphering software is read (Step 606), based on the read deciphering key and the deciphering software, the enciphered text and the attached file of the e-mail are deciphered separately (Step 608).

Here, if for some reason (for example, mix in of data not possible to be deciphered, or the like) the deciphering process according to Step 608 is not performed properly (Step 609, NO), then an error message such as 'a deciphering error has occurred' will be displayed via the monitor or the like (Step 611).

In this example, once the deciphering process is finished properly (Step 609 YES), the enciphered e-mail will be replaced (renewed) with an e-mail after the deciphering process. The enciphered e-mail can also be saved separate form the deciphered e-mail.

In the explanation using the above described flowchart, an expanded commercially available e-mail software has been utilized. However, an exclusive e-mail software may also be combined to the protected communication software as one body.

Also, the timing of the deciphering process has been described as the time of request for opening the e-mail, but deciphering may also be set to perform automatically at the time of receipt, or right after the receipt.

In the explanation of the above described flowchart, after the creation of the e-mail, the main text and the attached files are automatically enciphered. This is a structure on the assumption that the created e-mail is enciphered corresponding to such structure of the e-mail (mainly divided into address, main text, and attached file), a separate function from this, it may also be set so that the files besides e-mail are automatically enciphered based on the destination identification code designated each time. In such case, the enciphered file may be transmitted by attaching to an e-mail as an attachment file.

[Types and the Characteristics of the Enciphering that may be Used]

There are 2 major types of enciphering, a secret key system and an open key system, and both types can be used. For reference, there are approximately 100 types of enciphering software that receives high appraisal from the society and also acknowledged as effective software by the experts. The enciphering key and the enciphering software realized as one consolidated body is considered to pose practical problems. Considering the size of the enciphering key to be around 1K bytes, the consolidated key and software will be ranging from 1M bytes to 10M bytes. In other words, for example, in order to store the data of this size worth 10,000 people, 100G (10,000×10M) bytes of memory will be required, and therefore a hard disk having approximately 10G bytes will not have sufficient memory for storage. However, if a common enciphering software can be used, even if the enciphering keys needs to be stored for each 10,000 people, the size will be held down to approximately 10M bytes. In theory, the enciphering key and the enciphering software need not be separated, but the method of separating the enciphering key and the enciphering software will be described hereinafter for the reason that it is suitable for the current hardware situation.

According to the present embodiment, the commercial software for enciphering is produced having following structure:

(1) Having an enciphering key creation function, and freedom of distributing the key is authorized.
(2) The redistributing the enciphering software is authorized.
(3) Has a deciphering key creation function.
(4) The redistribution of the deciphering key can be prohibited.

Figure 7:
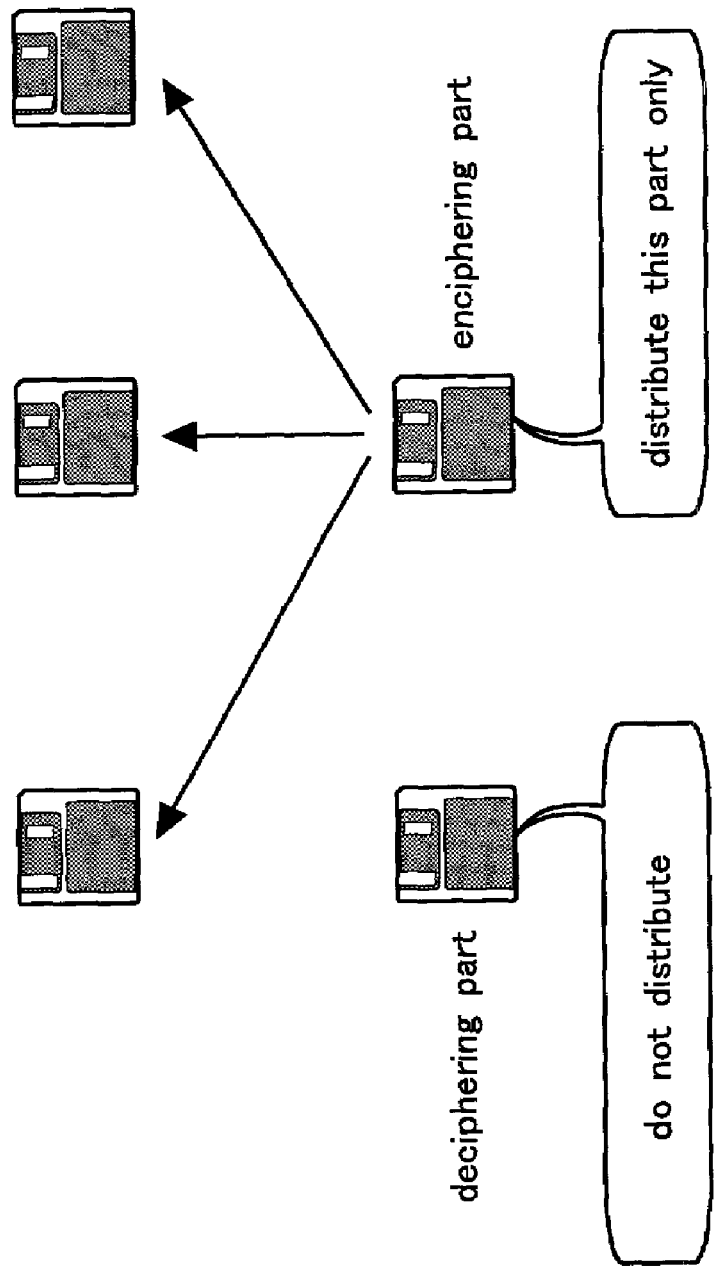
FIG. 7 is a diagram showing the content of an agreement regarding 'distribution'.

Provided that the above described (1) to (4) are fulfilled, both secret key system and open key system can be used. Also, as described in FIG. 7, only the enciphering part is distributed, and the deciphering part is held form distribution. If the deciphering part is distributed, then it is possible for somebody to secretly copy the deciphering part while it is still in the internet. If this is the case, then the enciphered communication may be deciphered in midst of transmission by someone who has obtained the deciphering part illegally, and enciphering will have no effect.

If the redistribution of the deciphering software can be prohibited, then the users of the enciphering software will each purchase the software, and thus enables the production and merchandising of the software on commercial bases. As a result, enabling the development of higher quality enciphering software.

The enciphering software can be self produced. However, a considerable amount of time and effort is required in order to produce safe enciphering software. Since numerous variations of enciphering software already exist, and Japan leads the world in some aspects, a realistic choice would be to select one that receives high appraisal from the society.

[A Case Using the Secret Key Crypto System]

When using the secret key system, the secret key and the enciphering software would be distributed beforehand. As a solid example, a case using Caesar enciphering system is described from hereinafter.

For example, Mr. Akiyama has decided to use Caesar enciphering system, and the information from Mr. Ito and Mr. Saito are enciphered using the enciphering keys (−1) and (2), respectively. The FIG. 8(a) to (c) shows an exemplary content of the address books of Mr. Akiyama, Mr. Ito, and Mr. Saito, respectively under such condition.

Mr. Akiyama transmits the enciphering key (Mr. Ito: '−1', Mr. Saito: '2') and enciphering software (C) to Mr. Ito and Mr. Saito. Mr. Ito and Mr. Saito register the enciphering key and the enciphering software under the enciphering part of their address books.

By so doing, a transmitted data from Mr. Ito to Mr. Akiyama 'IBM (data contents)', for example, is enciphered by the enciphering key (−1), and becomes 'HAL'. The enciphered text 'HAL' from Mr. Ito is deciphered by deciphering key (1), corresponding to communication from Mr. Ito to Mr. Akiyama, and returns to 'IBM'. The communication 'IBM' from Mr. Saito to Mr. Akiyama is enciphered using the enciphering key (2), and becomes 'KDO'. The enciphered text 'KDO' is deciphered using the deciphering key (−2) and returns to 'IBM'. In other words, this example is formed as the alphabets are each moved up in the alphabetical order by the value (number) shown by the enciphering key, and the alphabets are set to be brought back by the number shown by the deciphering key.

Figure 9:
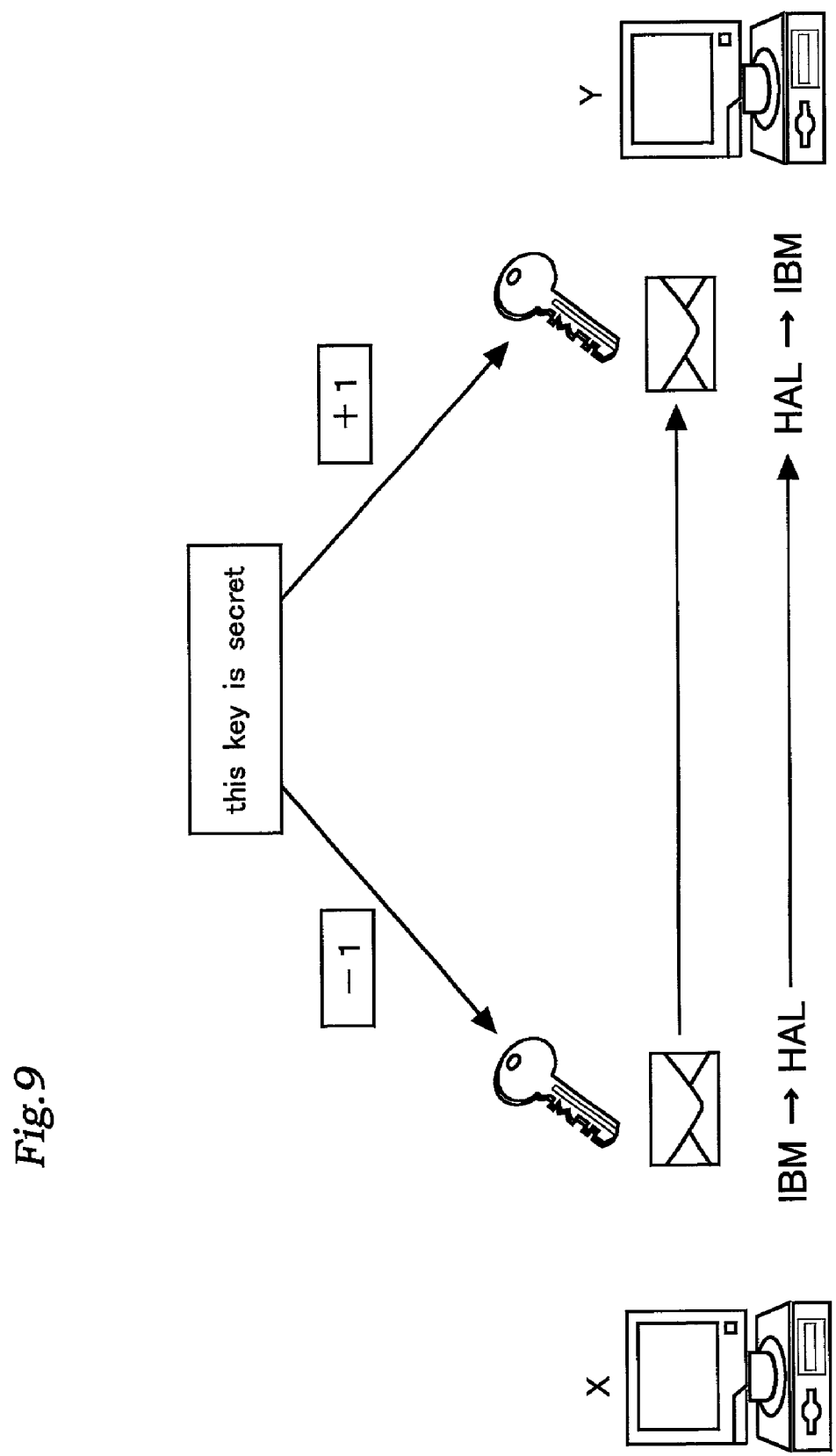
FIG. 9 is a schematic diagram showing a communication mode using secret key system.

FIG. 9 is a schematic diagram showing the communication mode using such secret key system. In this secret key system, it is particularly important to deliver the key for enciphering to the intended person in a safe manner. Therefore, exchanging the keys while actually seeing each other by contacting over the phone or the like would be preferred.

[A Case Using the Open Key Crypto System]

When using the open key system, the open keys need to be sent to all the intended people from whom the receipt of enciphered information is desired. Also, the same enciphering software should be distributed. Obviously, there are numerous embodiment variations amongst the open key system, and therefore, it is possible to utilize different open key system enciphering software for each intended person.

Figure 11:
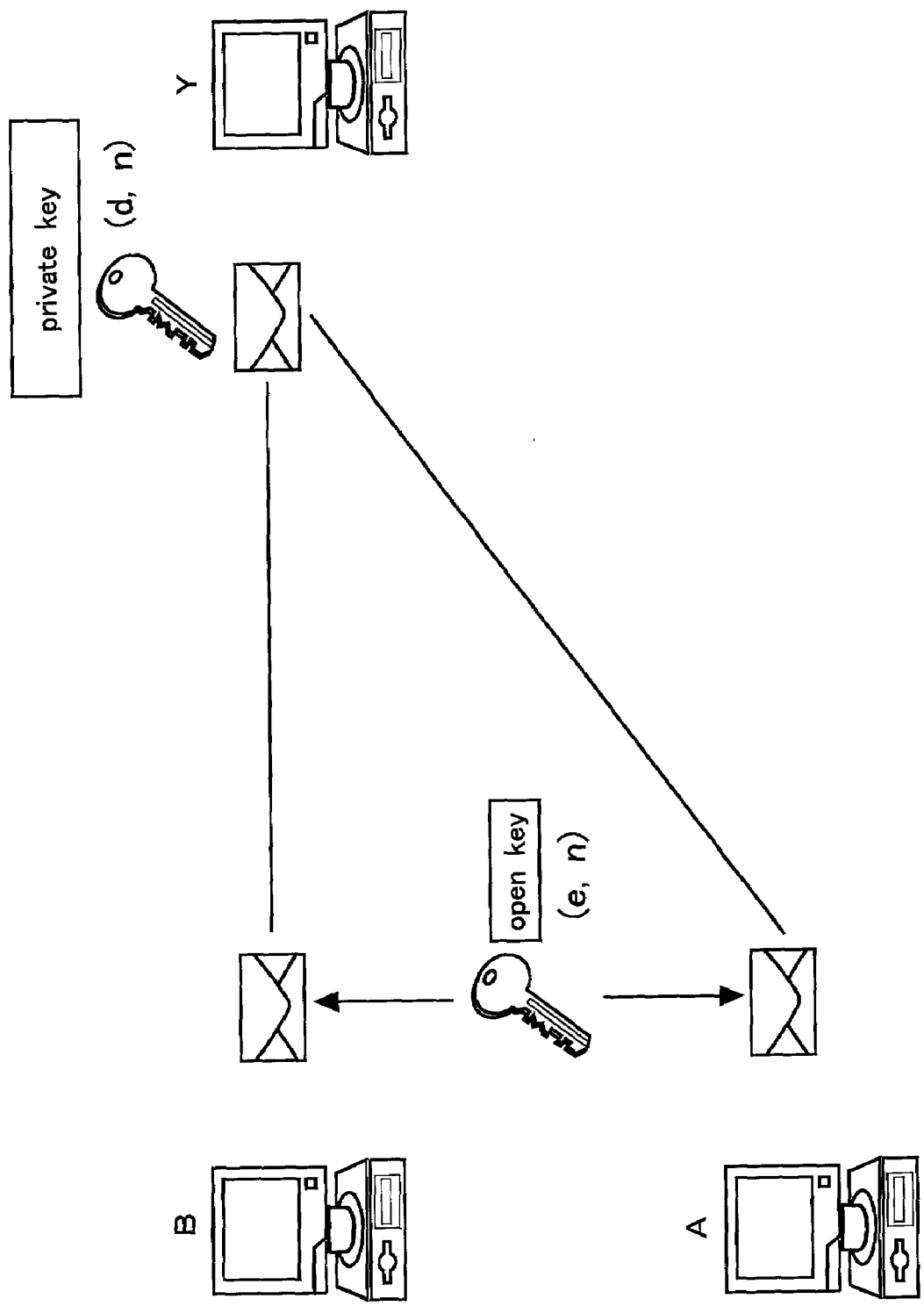
FIG. 11 is a schematic diagram showing a communication mode using open key system.

For a solid example, a case utilizing a discrete logarithm is described hereinafter. Prime numbers p, q are selected, and is set as n=pq. Then, K=1 cm (p−1, q−1) is set and number d is selected so that gcd (d, K)=1. Following, ed=1 (mod K) is set and an integer e is calculated so that O<e<K. Mr. Akiyama discloses e and n, and sends the enciphering software (C). d is kept secret and is registered to the address book along with n. FIG. 11 is a schematic diagram showing the communication mode utilizing such open key system.

FIG. 10(a) shows an exemplary address book of Mr. Akiyama in the above described case. FIGS. 10(b) and (c) shows the address book of Mr. Ito and Mr. Saito respectively, provided that Mr. Akiyama has sent the enciphering key and enciphering software to Mr. Ito and Mr. Saito.

If a numeral x is to be transmitted, the enciphering software C of Mr. Ito and Mr. Saito, calculates $x\hat{}e \equiv c$ (mod n), and c is transmitted to Mr. Akiyama. The receiver, Mr. Akiyama obtains x from $x\hat{}d \equiv x$ (mod n). In other words, x is obtained by using the modulo n calculation from the dth power of c.

There are some problems with the open key system shown in FIG. 11. The confirmation of whom exactly it is that owns the open key is very difficult.

One way of revealing the owner of the open key is to attach an identification statement to the open key. However, if the authorized office for publishing the identification document is required to run an independent investigation by searching an inquiry agency, database and the like, the publishing fee will be expensive.

The contents shown on a regular identification documents only shows what the individual claims. Therefore, the most certain way is to actually meeting the intended individual and to receive the open key in person.

Considering a situation of making acquaintances over the network, and the only information known is the network address and the name. When the individual requests, "Please send the information using this method for enciphering", and then the information may be enciphered and then transmitted without regard to that individual's real name or status.

[A Distribution Method of the Enciphering Key and Enciphering Software]

It is required to have the sender of information, to own the enciphering key and the enciphering software. There are various ways of delivering such as, giving the information saved on the floppy disk in person, mailing such disk, and transmitting over the network by enciphering the secret key with the open key system. Also, for problems associated with exchanging the enciphering keys, refer to "A Guide for Security Countermeasures by Enciphering" published by Shoueisha for example, or the like.

Still, exchanging the enciphering software and enciphering key selected by each other in person, is considered to be simple and certain.

[Registration of Enciphering Key and Enciphering Software]

The enciphering key and the enciphering software are registered in the address book of the receiver of the enciphering key and the enciphering software. For example, suppose that Mr. Akiyama has decided to use enciphering for communication with Mr. Ito. The enciphering method is determined corresponding to the ordered pair (Mr. Ito, Mr. Akiyama). The enciphering method when Mr. Akiyama receives the communication from Mr. Ito, is set to be C (i, a). Mr. Akiyama meets with Mr. Ito, and delivers the enciphering software (Cia) and the enciphering key (KCia) personally. Mr. Ito registers the enciphering software and the enciphering key in the address book under Mr. Akiyama, and saves the enciphering key and the enciphering software in the hard disk. FIG. 12(a) is an example of Mr. Ito's address book in this case.

[The Registration of the Deciphering Software]

Mr. Akiyama has determined the enciphering method for receiving communication from Mr. Ito, and by this, the deciphering key (KPia) and deciphering software (Pia) is determined. The determined deciphering information is registered in Mr. Akiyama's address book under Mr. Ito's deciphering key and deciphering software columns. FIG. 12(b) is an example of Mr. Akiyama's address book in this case.

By this address book, Mr. Akiyama is able to have transmission from Mr. Ito (Cia) in an enciphered form. Also, the received information is automatically deciphered by (Pia).

Also, Mr. Akiyama may use the same enciphering method and same enciphering key for communication with other individuals apart from Mr. Ito. Further, the communication among other individuals may be performed using the same enciphering software, and different enciphering keys.

Also, a completely different method may be used to perform enciphered communication. This is because the ordered pair of the sender and the receiver determines the enciphering method and the embodiment mode. Similarly, it is clear that Mr. Ito may select a different enciphering method for receiving information from Mr. Akiyama.

[The Significance of Prohibiting the Redistribution of the Deciphering Software]

By setting the enciphering software not to function as a deciphering software simultaneously, the users purchasing the enciphering software of the protected communication system employed in the present embodiment, are each required to purchase an enciphering software separately. This is due to prohibition of deciphering software redistribution. This guarantees the commercial development of the enciphering software, and thus has a potential of becoming the economical base for safer communication. The development of enciphering software requires a long term research, and a high quality enciphering software cannot be developed without economical guarantee.

[The Uniqueness in the Names of Enciphering Software]

Different enciphering software given the same name will create problem upon saving into the hard disk. Therefore, a unique identification symbol (such as the e-mail address) of the enciphering software developer should be used as the name for the enciphering software in order to avoid conflict of names.

[Industrial Applicability]

Suppose a security company (X company) provides information for the clients at a fee. Also suppose that a client has an interest in the automobile companies. For that client, information would be considered valuable even at a high price if an automobile company's development information for a new car were delivered solely for that individual.

However in reality, the delivery of this information that the client would like only himself/herself to know may be in danger of theft or falsification, and leaves an anxiety. Therefore, suppose the X Company has employed the ordered pair system enciphering communication. FIG. 1(c) shows an example of the client address book of X Company.

X Company delivers information of economical field of interest to the clients at a fee. As a general rule, the client determines the enciphering method, but it is also required for the X Company to introduce approximately 10 variations of enciphering software receiving high social appraisal. In turn, the X Company determines the enciphering method for receiving orders and the like from the clients. The methods may be changed according to the purchasing power of the clients.

If possible, producing as many deciphering keys as the number of clients would be convenient. However, a deciphering software that enables the use of different deciphering keys for the client but allowing the use of one common deciphering software would be preferred. Here also, the merit of enabling the separation of the deciphering key and the deciphering software can be seen.

A valuable economical information would be preferable to be sent solely for oneself, and would like to prevent this information from being tapped or receive falsification over the network. This method allows the protection of information solely for oneself at the clients' responsibility. This can add further additional value added to the information. This will become an essential method of delivering information of economically high in value.

[The Use by an Individual]

FIGS. 1(a) and (b) shows the address book of an individual utilizing this method. When used by an individual, the economical burden needs to be considered.

For the open key enciphering, only one type of deciphering key and deciphering software is required, since the same enciphering key can be distributed. Also a different open key system can be employed for commercial communication and for communication amongst friends.

For the secret key system, a different secret key is produced for each intended person, and the corresponding deciphering key is saved in the address book under the deciphering column. The resources such as the hard disk can be saved for the same enciphering software and the same deciphering software may be used for different keys. Of course, the enciphering method may be changed depending on the communication partner.

An enciphering software will be relatively large in size if it is combined with the enciphering key as one body, and amount of numbers of people in the address book is required to be prepared in the hard disk. As the number of people increases, the memory becomes insufficient for the hard disk having approximately 20G bytes. Therefore, the enciphering keys, small in size, may be prepared as many as the number of people listed in the address book, but the enciphering software, large in size, is preferred to be used commonly. There are approximately 100 enciphering software currently accepted as being effective. Only 100 types of enciphering software need to be placed in the hard disk, if the enciphering software can be utilized commonly. Also, it is possible to distribute the enciphering software alone, as a supplement to a magazine and the like. Therefore, obtaining the software in such a manner and exchange only the enciphering keys may be considered as a realistic method.

Upon transmitting an e-mail, the destination address and the address of the sender are determined first, and then, the ordered pair of sender and receiver is determined. The information will be enciphered automatically using an enciphering method corresponding to the ordered pair.

On the receiver's side, an ordered pair given by the address of the sender and the own address, which is the destination address, determines a deciphering method and the transmitted enciphered information is automatically deciphered.

For example, Mr. Akiyama determines the enciphering method to be used for receiving information from Mr. Ito. Mr. Akiyama prepares the enciphering key (KCia), enciphering software (Cia), deciphering key (KPia), and deciphering software (Pia) to be used in communication with Mr. Ito, and among them, information regarding the enciphering key (KCia) and enciphering software (Cia) is sent to Mr. Ito beforehand. Mr. Ito registers the enciphering key and the enciphering software in his address book under Mr. Akiyama's column.

An e-mail from Mr. Ito to Mr. Akiyama will be enciphered by enciphering method (Cia) and enciphering key (KCia), determined by Mr. Akiyama. The communication software of Mr. Akiyama receiving this e-mail, can make the distinction between the sender's address and the own address, and automatically selects the deciphering key (KPia) and the deciphering method (Pia), and deciphering is performed using this method.

On the other hand, Mr. Ito determines the enciphering method for receiving information from Mr. Akiyama. Of course, Mr. Ito may determine this method freely. Mr. Ito prepares the enciphering key (KCia), enciphering software (Cia), deciphering key (KPia), and deciphering software (Pia) to be used in communication with Mr. Akiyama, and among them, information regarding the enciphering key (KCia) and enciphering software (Cia) is sent to Mr. Akiyama beforehand.

An e-mail from Mr. Akiyama to Mr. Ito will be enciphered by enciphering method (Cia) and enciphering key (KCia), determined by Mr. Ito. Mr. Ito, receiving this e-mail, uses deciphering key (KPai) and deciphering software (Pai) for Mr. Akiyama and deciphers the information.

[Renewal of Enciphering Method]

The enciphering technology is improving at an amazing speed, and simultaneously, the deciphering technology is improving. One enciphering method is considered to be safe for 5 years at most. Therefore, enabling the receiver of information to freely renew the enciphering technology used would be preferred.

According to the ordered pair system crypto-communication shown in this form of embodiment, the receiver of information may freely perform renewal. Thus, the crypto-technology of highest quality available at that time may be selected.

An individual deciding to use a new enciphering method purchases new enciphering software, distributes the enciphering part to people listed in the address book, and request registration renewal. Also, renew the registration content of the deciphering part of the own address book.

Of course, there are people only needing simple enciphering, and also people not needing enciphering, but the fact that a person determines by his/her will, the enciphering method suited for the value of the information handled, just like a person choosing a key to his/her own room, is important.

[Expanding the Functions]

It is possible to use plural of enciphering and deciphering keys to provide multiple enciphering. Especially for providing information at a fee, apart from enciphering method determined by the client, an enciphering method considered to have the minimal strength by the company, should also be employed, and at least enciphering the information twice (multiple enciphering) is preferred. Multiple enciphering is described in the following.

In order to enable multiple enciphering with ease, the process needs to be automated. Consider an address book such as the one shown in FIG. 13. As shown in the drawing, each person (the destination address) is set with plural of enciphering column (enciphering 1,2, . . . ) and deciphering column (deciphering 1,2, . . . ), and performs multiple enciphering of the transmission content by designated software and key in the column.

Figure 14:
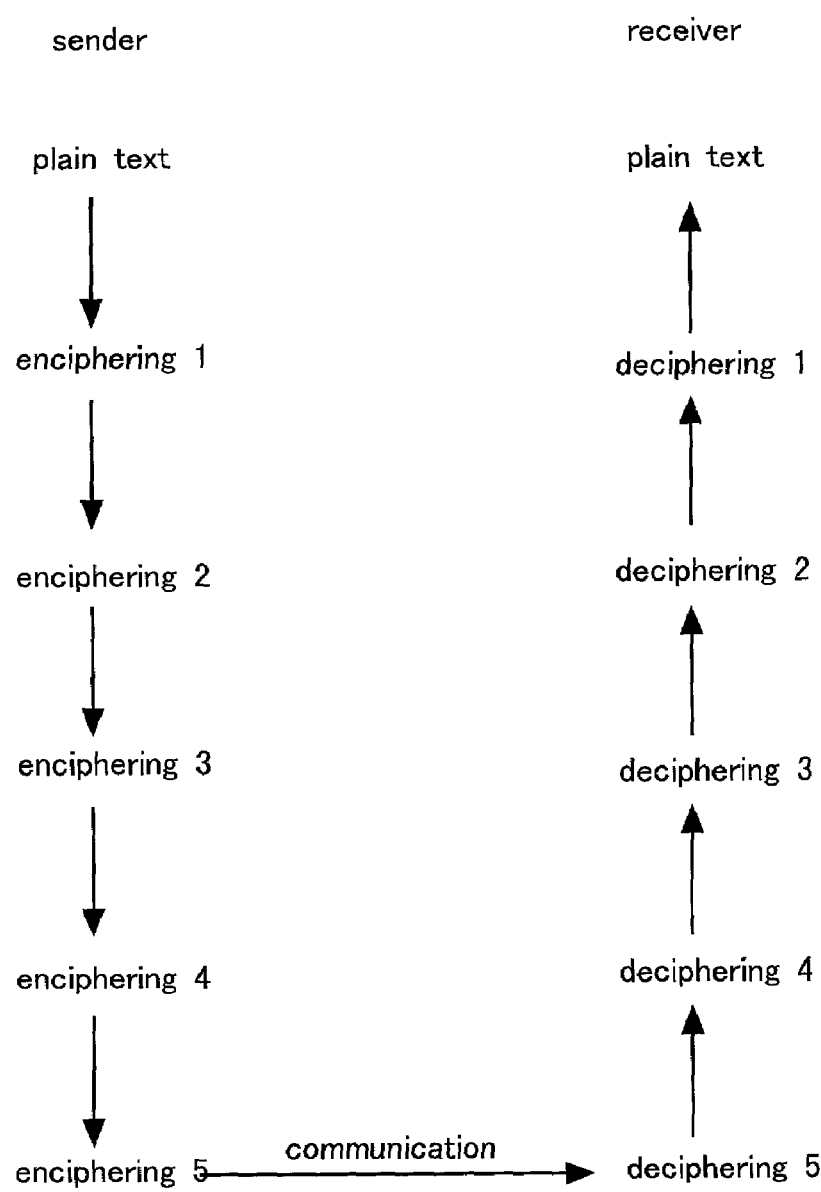
FIG. 14 is a diagram showing the processing content (order) regarding multiple enciphering.
Figure 19:
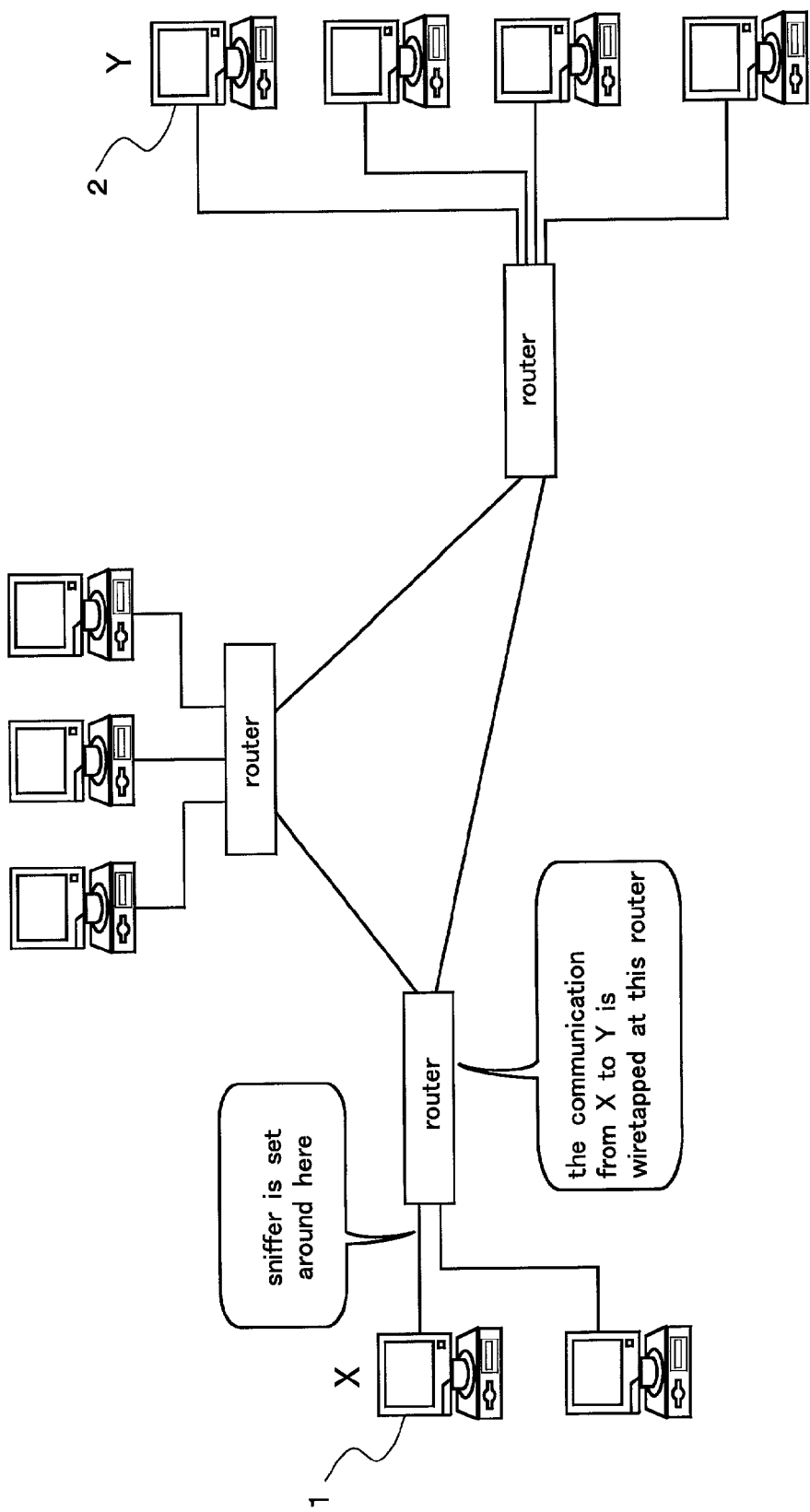
FIG. 19 is a diagram showing a problem regarding regular network communication.

More specifically, plural of enciphering software and enciphering keys, and deciphering software and deciphering keys, are registered. According to this table, enciphering and deciphering are performed automatically at the time of transmission and reception. FIG. 14 shows the process order of multiple enciphering and deciphering (multiple). According to the example given in the drawing, the enciphering process is performed 5 times (5 stages) at the time of transmission, and at the time of reception, deciphering process is similarly performed 5 times in an opposite order from the time of transmission. Also, the enciphering software used in each stage does not have to be all different in case of multiple enciphering. For example, only the enciphering keys may be varied in each stage while using single software as the enciphering software.

[The Effects of Multiple Enciphering]

Currently, the mainstream of enciphering is by open key system, however, there are no guarantee of being safe in the future. The deciphering technology may rapidly improve over the enciphering technology. A considerable amount of enciphering method can be used including the old enciphering method. By combining these methods, the increase in time required for deciphering will significantly increase compared to the increase in processing time. This will compensate for the delay in the improvement of the enciphering technology.

In the above described example, out of 100 variations of enciphering software, 5 is selected and used. If which 5 method, and in what order the are used is not known, then the amount of time required to deciphering will be 100 to the power of 5 times as much. The processing time is only 5 times as much, therefore, considering the fact that the processing speed of CPU is improving day by day, this processing time of 5 times is a problem that can be solved by purchasing a new fifty thousand yen computer.

Further, the enciphering and deciphering are automatically performed according to the contents listed in the address book, so the users are not needed to perform cumbersome operations.

[Improvement in the Processing Speed]

Adding another column to the address book for the multiplicity adjustment regarding multiple enciphering, and the degree of multiplicity of enciphering may be varied between the main text and the attachment file of a single e-mail. By so doing, the processing speed as a whole can be reduced by decreasing the degree of multiplicity of enciphering to the image files and the like.

For example, as shown in the address book in FIG. 15, the main text of an e-mail for Mr. Uyama is enciphered in multiple stages by using enciphering software listed in columns 1, 2, 3, 4, and 5 (supposing that enciphering 1 to enciphering 5 columns exists), and the attachment files are enciphered using enciphering software in columns 4 and 2. Also, the main text of an e-mail from Mr. Uyama is deciphered using deciphering software in columns 1 and 3, and the attachment files are deciphered using deciphering software of column 5.

By setting the degree of multiplicity of enciphering required for each part, the time spent on enciphering and deciphering can be saved.

[Elimination of Fixation for a Long Period of Time]

Using the same enciphering in the same order for a long period of time increases the chances of getting intercepted. Hence, a schedule file is established to avoid fixation for a long period of time. For example, as shown in FIG. 16, the enciphering order is set to change automatically (in this example, the 'order of use' of the software and keys are changed (replaced)) per month according to this schedule file (rule). For instance, the order of the first month being 12345, becomes in the order of 31524 in the next month, and further becomes in the order of 53412 the following month (not shown in the figures).

After a certain period of time (3 years for example) has passed, a message is displayed suggesting the use of a new enciphering method, or a message suggesting the increase the stages will be preferred.

A various mode other than the above described method can be considered for automatic renewal in order to avoid the fixation of the enciphering method. As an example of another method, for instance, every time a certain amount of transmission to a specified destination address (in this case the number of transmission is counted and once the count value reaches certain amount), the software and/or the keys (enciphering column) used for the destination address is automatically changed (for example, among numerous software and/or keys corresponding to each person, an optional software and key are newly selected according to pre-set rules). In this case, the deciphering column of the address book on the receiver side performs the change at the same timing (counting the number of times received) and according to the same rules.

[In Case of a Telephone]

The above described ordered pair system enciphering communication can also be applied to the telephone. When using this method on telephone, several communication standards need to be determined. First, standardizing the sampling rate at the time of digitalization of voice. Secondly, the digitalized voice is enciphered per certain amount and the standardization regarding the amount.

Provided that these 2 points are determined, then, by utilizing number notification feature of the caller ID (Identification) and the like, the telephone numbers of the transmitter and the receiver can be specified, and the enciphering determined by this ordered pair enables the protected communication over the telephone as well.

In case of a home telephone, interlocking a memory device and an operation device is simple, and there is no power problem, therefore the only problem that needs to be solved is the processing speed of enciphering and deciphering.

In case of a mobile telephone, a problem regarding the memory device can be solved by a memory stick and the like. And simplifying the enciphering method can solve the large size of operation device.

For example, suppose that the data is enciphered per every 1,024 bit. The enciphering key and the deciphering key are set as a sentence as long as the length of this bit value, and both the transmitter and the receiver uses the same sentence. Suppose that the enciphering method and the deciphering method is XOR. Both enciphering and deciphering can be realized as the XOR per 1,024 bits of the key sentence and the digital data. The sentence can be written in the memory device. The use of a full scale operation device is not needed, for a simple circuit can realize XOR alone. Each person can choose a sentence of their preference and have the other person register that sentence.

As the third and remaining problem, is the production of a telephone machine interlocked with memory device and operation device. This will arise a new demand. Producing and merchandising such computer-like telephone machine may contribute to the economical recovery of Japan.

For the above described use on telephone, as well as for the mobile telephone, method from the user's own part will be needed. This is because people having enough knowledge regarding telephones, and having money would, easily tap the enciphering method provided by the telephone company alone. By utilizing the idea of ordered pair system enciphering communication, the communication can still be kept a secret even when tapped.

Considering the ability of the operation device of current mobile telephones, the enciphering method needs to be limited in order to be processed in real time. Since the object of delivery is the human voice, selecting the XOR of the character arrangement and digitalized voice signal is the realistic choice.

Utilizing the method of multiple enciphering, the character arrangement is doubled, one character arrangement using full-size characters, and the other character arrangement using half-width characters so that there are no common characters among the two. By setting each character arrangement to be prime in length, a powerful and fast enciphering can be realized.

The same character arrangement as the enciphering key is repeatedly used when the voice signal is long. When using a single character arrangement, if the length of the character arrangement is short, then this repetition of use is increased. This increases the possibility of the enciphered voice signal to be deciphered. A simple thought is to use a long character arrangement as the key and prevent repetition. However, not simply saving a long character arrangement into the memory, but using numerous character arrangements each prime in length instead, will provide similar effect as having a long character arrangement using less memory. A concrete example is described in the following.

Consider a case using 2 character arrangements. Regarding telephones, the problem of the processing speed is the largest problem. Among the operation having reversibility and also performing at high speed, is an operation taking exclusive or (XOR). Calculated as following, OXORO=O, OXOR1=1, 1XORO=1, and 1XOR1=O. The basic mode using this regarding ordered pair system is described in the following.

Consider a case of a telephone communication between Mr. S and Mr. R. For example, the content of the telephone memory of Mr. S and the content of the telephone memory of Mr. R are shown in FIG. 17(a), and FIG. 17(b) respectively. In the figures, words in quotation marks are alphabets representing Japanese characters with hyphens separating each represented character.

Suppose that Mr. S said to Mr. R, <こんにちは) "Ko-n-ni-chi-wa" meaning "hello" in Japanese . . . >. The result of digitalization of the analog voice signal is, 0x1216, 0x0800, 0x1182. . . When JIS code was used as the character code, あおいそら("a-o-i-so-ra" a Japanese word for "blue sky"consisting of 5 characters written using Japanese characters called Hiragana) . . . > will be, 0x2422, 0x242A, 0x2424, 0x243D, 0x2469. . . , and <Oaufefhgoo . . . > becomes, 0x4f, 0x62 . . .

0x1216, when displayed per bit is, 0001 0010 0001 0110,
0x2422, when displayed per bit is, 0010 0100 0010 0010.
0x4f 0x61, when displayed per bit is, 0100 1111 0110 0001.

Mr. R receives this value 0x7955 . . . First, regarding 0x7955=0111 1001 0101 0101, XOR is obtained by using the saved character code, <あおいそら(a-o-i-so-ra) . . . > is 0x2422, 0x242A, 0x2424, 0x243D, 0x2469, . . . , <Oaufefhgoo . . . > is 0x4f, 0x62, . . . The digitalized original voice signal is obtained by continuing this process. The voice of Mr. S, <こんにちは Ko-n-ni-chi-wa) . . . > can be heard by converting the digital signal back to the analog signal.

The response from Mr. R, <Sさんですか ("S sa-n de-su-ka" meaning "Is this Mr. S" in Japanese) . . . > is enciphered by enciphering keys <abcdefg . . . > and <なにかな ("na-ni-ka-na" a Japanese word for "what is it" consisting of 4 characters written in Hiragana) . . . >, then it is deciphered in the telephone machine of Mr. S by deciphering key <abcdefg . . . > and <なにかな(na-ni-ka-na) . . . >, and the voice of Mr. R <Sさんですか (S sa-n de-su-ka) . . . > can be heard.

For those people tapping along the way, the voice cannot be deciphered without knowing the double character arrangement. Even when spoken the same words, the waveform when put into voice differs for each person, and additionally takes XOR of double character arrangement, therefore deciphering will be difficult.

Since the enciphering is processed with the setting selected by the users themselves, deciphering will be extremely difficult even for the person tapping, who has enough knowledge of telephones.

[A Relationship Between Two Character Arrangements]

In case of using double character arrangements, the two character arrangements are created such as one using full-size characters and another using half-width characters, so that there are no common characters between the two. This is because if common characters were superimposed, that part would not be enciphered.

The two character arrangements should both be prime (the greatest common divisor being 1) in length, and the least common multiple of the length should be large.

For example, as shown in FIG. 18(a), the use of character arrangement having the length of 3 <はてな("ha-te-na" a Japanese word for "let me see" consisting of 3 characters written in Hiragana) . . . > and character arrangement having the length of 5 <あおいそら(a-o-i-so-ra) . . . >, would be the same as using a key having a length of 15.

At this time, the repeated use of key occur every 15 characters. This repetition is preferred to occur as less as possible.

If the two character arrangements having 991 characters and 997 characters were used as the keys, it would be corresponding to the use of a single character arrangement having 988,027 characters for enciphering.

[In Case of Using Three Character Arrangements as the Keys]

For example, in case of using three character arrangements, supposing, 1024, 997, and 991 are the length of each character arrangement, when compared to the use of a single character arrangement, it would be corresponding to the use of a character arrangement having 1,011,739,648 characters in length. For this reason, when using multiple character arrangements, each character arrangement prime in length should be selected.

As an example shown in FIG. 18(b), the three character arrangements should be a mix of affiliated arrangement of full-size characters (key 1), affiliated arrangement of alphabets (key 2), and affiliated arrangement of numbers (key 3), in order to provide complexity.

Also, regarding protected communication of a telephone machine, further, it would be convenient to have the following functions.

1. A feature enabling the established character arrangement to be transmitted directly to the telephone machine of the intended person via a cable or the like, without going through a telephone exchange office, or a relay station. (For example, C mail (registered trademark of KDDI Inc.) of au (a name of registered trademark of KDDI Inc.) and the like)
2. A feature displaying the enciphering key as * * * * * * *, and prevents the key from being changed without the user ID.
3. A feature that checks whether the entered character arrangements is each prime in length.
4. A feature that confirms the existence of same characters among a plurality of the character arrangements.
5. A feature that displays a message recommending the renewal of character arrangement as the key after certain amount of time period has passed (for example 6 months).
6. A feature that creates the character arrangement of the key in appropriate length from information such as the time, the name of the other person and/or telephone number, and the like.

According to the above described embodiments, a protected communication high in safety (secrecy) can easily be realized compared to previous method of protected communication tending to be in fixed form. Also, corresponding to the improvement in the deciphering technology, a new enciphering method can easily replace the old method, thereby increasing the degree of safety to even higher level. Therefore, the spread into communication in general may be expected, and contribute to a realization of a network society with high safety level.

Also, according to the explanation given in the above, the enciphering process is performed by using enciphering method designated by the receiver beforehand, however, there is no need to be restricted to this method. Provided that the deciphering is possible on the receiver's side, then the enciphering method may be determined by the receiver's side for each file to be transmitted.

Also the enciphering method described in the above embodiment, for example, numerous enciphering methods divided into ranks may be prepared (set with correspondence) for each destination address, and automatically selects the enciphering method according to the degree of rank determined by the transmitter each time.

THE EFFECT OF THE INVENTION

As it is clear from the above explanation, according to the present invention, a highly safe communication, preventing communication interception and the like among the network communication can be easily realized.

What is claimed is:

1. A computer program stored on an information processing device having a memory enabling an electronic mail communication operation over the internet, wherein,
   the memory having a reference table, a plurality of rows each corresponding to a single electronic mail address, an address column storing an electronic mail address, an enciphering column which includes a key area storing an enciphering key identifier and a software area storing an enciphering software identifier, and a deciphering column which includes a key area storing a deciphering key identifier and a software area storing a deciphering software,
   the reference table being rewritable in response to a prescribed user operation,
   the computer program containing instructions which upon execution carries out the following method steps:
   automatically enciphering a file to be transmitted according to an enciphering key and an enciphering software upon an input of a prescribed enciphering instruction, wherein the specified enciphering key and the enciphering software are specified by looking up the enciphering column of a row of the reference table, the row being specified by using the designated transmission destination electronic mail address as a key, and are read out from the memory of the information processing device by using an enciphering key identifier and an enciphering software identifier, read out from the enciphering column of the reference table, as a key; and
   automatically deciphering a received enciphered file according to a specified deciphering key and a deciphering software upon an input of a prescribed deciphering instruction, wherein the deciphering key and a deciphering software are specified by looking up the deciphering column of a row of the reference table, the row being specified by using the transmission source electronic mail address as a key, and are read out from the memory of the information processing device by using a deciphering key identifier and a deciphering software identifier, read out from the deciphering column of the reference table, as a key.

2. A computer program according to claim 1, wherein;
   said enciphering column of the reference table has a plurality of enciphering sub-columns each including a pair of a key area and a software area, the key area storing a enciphering key identifier and the software area storing an enciphering software identifier, wherein the file to be transmitted is enciphered in multiple stages using a plurality of pairs of the enciphering key and the software specified by looking up the enciphering sub-columns in a sequence based on a prescribed application order data indicating an order in which each of the pairs of the enciphering key and the enciphering software is applied; and
   said deciphering column of the reference table has a plurality of deciphering sub-columns each including a key area storing a deciphering key identifier and a software area storing deciphering software identifier, wherein the enciphered file is deciphered in multiple stages using a plurality of deciphering keys and software specified by looking up the deciphering sub-columns in a sequence based on a prescribed application order data indicating an order in which each of the pairs of the deciphering key and the deciphering software is applied.

3. A computer program according to claim 2, wherein said reference table has an application order data column for enciphering including a main text area and an attachment area, and an application order data column for deciphering including a main text area and an attachment area, whereby
   a main text and an attachment of an electronic mail to be transmitted are separately enciphered in multiple stages using a plurality of enciphering keys and software specified by looking up the main text area and the attachment area of the application order data column for enciphering, and
   a received enciphered main text and an attachment are separately deciphered in multiple stage using a plurality of deciphering keys and deciphering software specified by looking up the main text area and the attachment area of the application order data column for deciphering.

4. A computer program according to claim 2, wherein the application order data is automatically changed according to a pre-set rule.

5. A telephone machine having a transmitter notification means; comprising,
   means for installing an enciphering program and a deciphering program;
   first memory means for storing enciphering reference data in which a transmission destination telephone number is pre-set to correspond to an optional enciphering program;
   second memory means for storing deciphering reference data in which a transmission source telephone number is pre-set to correspond to an optional deciphering program;
   means for enciphering and transmitting a voice signal to be transmitted using the enciphering program, wherein said enciphering program to be used for communication is identified based on the transmission destination telephone number of the communication provided in the enciphered reference data; and
   means for deciphering and audibly outputting voice of the received voice using the deciphering program, wherein the deciphering program to be used in specified based on the data of the transmission source telephone number of the communication, and the deciphering reference data, wherein the transmission source telephone number is stored in the first memory means together with a separate enciphering key and a separate deciphering key, the first memory means corresponding to a first reference table having a separate row for each telephone number stored therein, and wherein the destination telephone number is stored in the second memory means together with a separate enciphering key and a separate deciphering key, the second memory means corresponding to a second reference table having a separate row for each telephone number stored therein.

6. A telephone machine according to claim 5, wherein;

said first reference table is enabled to have a plurality of kinds of enciphering programs corresponding to a single transmission destination telephone number, wherein the voice signal to be transmitted to the transmission destination has predetermined corresponding enciphering programs, is enciphered in multiple stages using a plurality of kinds of enciphering programs; and said second reference table is enabled to have a plurality of kinds of deciphering programs corresponding to a single transmission source telephone number, wherein the enciphered voice signal transmitted from the transmission source telephone number has corresponding predetermined deciphering programs, is deciphered in multiple stages using a number of the plurality of deciphering programs.

* * * * *